(12) United States Patent
Aftanas et al.

(10) Patent No.: US 8,627,989 B2
(45) Date of Patent: Jan. 14, 2014

(54) SUPPORT RAIL FOR A VEHICLE ARTICLE CARRIER HAVING BLOW MOLDED DECORATIVE RAIL STRUCTURE

(75) Inventors: Jeffrey M. Aftanas, Ortonville, MI (US); Noel V. Ranka, Canton, MI (US); Donald L. Munoz, Bloomfield Hills, MI (US)

(73) Assignee: JAC Products, Inc., Saline, MI (US)

( * ) Notice: Subject to any disclaimer, the term of this patent is extended or adjusted under 35 U.S.C. 154(b) by 17 days.

(21) Appl. No.: 13/431,287

(22) Filed: Mar. 27, 2012

(65) Prior Publication Data

US 2012/0248164 A1    Oct. 4, 2012

Related U.S. Application Data

(60) Provisional application No. 61/468,723, filed on Mar. 29, 2011.

(51) Int. Cl.
    *B60R 9/04*    (2006.01)
(52) U.S. Cl.
    USPC .......................................... 224/326; 224/309
(58) Field of Classification Search
    USPC .................... 224/309, 322, 325, 326; 296/210
    See application file for complete search history.

(56) References Cited

U.S. PATENT DOCUMENTS

| | | | | |
|---|---|---|---|---|
| 4,834,448 A | * | 5/1989 | Sakamoto et al. | 296/210 |
| 5,464,140 A | * | 11/1995 | Hill | 224/321 |
| 5,855,840 A | | 1/1999 | Cucheran et al. | |
| 5,960,658 A | | 10/1999 | Hudson et al. | |
| 5,975,391 A | | 11/1999 | Aftanas et al. | |
| 5,997,797 A | | 12/1999 | Heuchert | |
| 6,089,427 A | | 7/2000 | Evels et al. | |
| 6,158,637 A | | 12/2000 | Fisch et al. | |
| 6,845,893 B2 | * | 1/2005 | Nelson | 224/322 |
| 7,017,788 B2 | * | 3/2006 | Trambley et al. | 224/326 |
| 8,499,988 B2 | * | 8/2013 | Garland et al. | 224/321 |
| 2007/0108243 A1 | * | 5/2007 | Bingham | 224/326 |

* cited by examiner

*Primary Examiner* — Justin Larson
(74) *Attorney, Agent, or Firm* — Harness, Dickey & Pierce, P.L.C.

(57) ABSTRACT

A vehicle article carrier adapted to carry articles above an outer body surface of a vehicle. A pair of support rails are used, each formed from a non-metallic material, and each further including a bottom wall having at least one cutout potion at an intermediate point along its length. At least one cross bar may be supported from the support rails. At least one bracket may be associated with each support rail. The bracket is dimensioned to fit within the cutout portion in its support rail. The cross bar may be secured directly to the brackets such that ends of the cross bar are fully supported only by the brackets and the outer body surface of the vehicle. Thus, the support rails experience substantially no load from the brackets and the cross bar attached to the brackets.

20 Claims, 6 Drawing Sheets

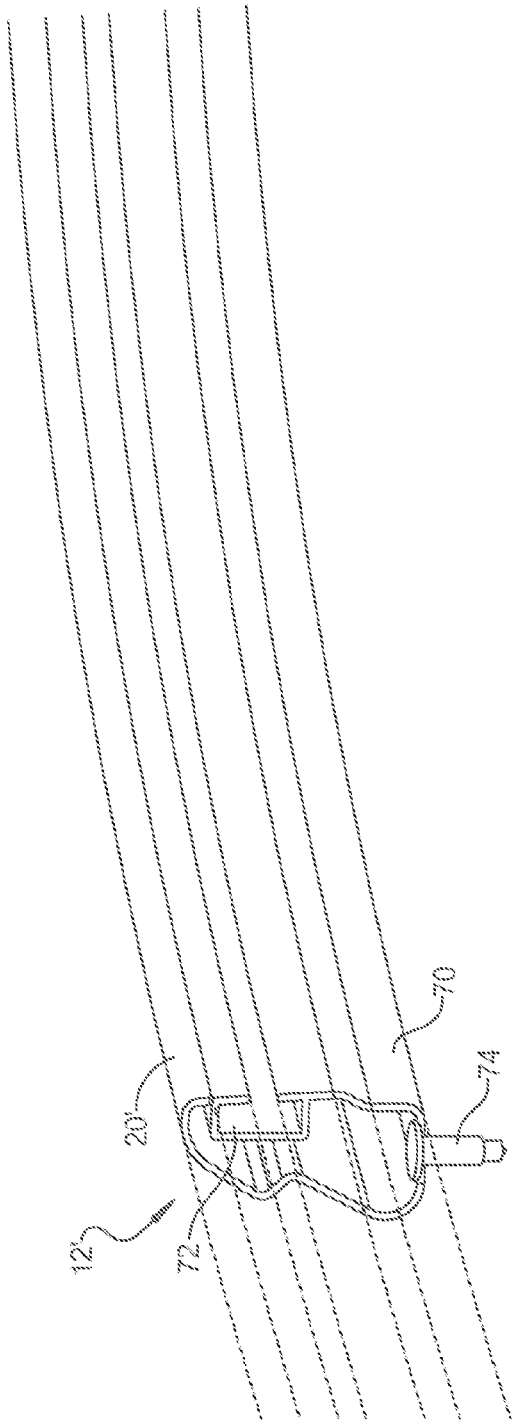

SUPPORT RAIL FOR A VEHICLE ARTICLE CARRIER HAVING BLOW MOLDED DECORATIVE RAIL STRUCTURE

CROSS-REFERENCE TO RELATED APPLICATIONS

This application claims the benefit of U.S. Provisional Application No. 61/468,723, filed on Mar. 29, 2011. The entire disclosure of the above application is incorporated herein by reference.

FIELD

The present disclosure relates to vehicle article carriers, and more particularly to a decorative blow molded support rail for a vehicle article carrier.

BACKGROUND

The statements in this section merely provide background information related to the present disclosure and may not constitute prior art.

Vehicle article carriers are used in a wide variety of applications to transport articles on various forms of vehicles such as cars, minivans, SUVs and sometimes on trucks. Such vehicle article carriers typically include a pair of support rails which are fixedly secured to an outer body surface of the vehicle parallel to one another, and parallel to a longitudinal axis of the vehicle. Often one or more cross bars are supported from the support rails. The cross bars allow various articles to be supported thereon above the roof of the vehicle.

Typically the support rails are formed from aluminum or another high strength metallic material, and often extend 4-6 feet in length. The cross rails are then secured by suitable fasteners, sometimes RIVNUT® style fasteners, to the roof of the vehicle. However, manufacturing the support rails from a metallic material such as aluminum can be relatively expensive. The metallic material is needed for strength purposes to adequately support the cross bars and the weight they can be anticipated to carry at virtually any point along the length of the cross bars. However, in many instances, a wide degree of adjustability of the cross bars is not needed. Often a standardized spacing of the cross bars is sufficient to meet the needs of most individuals.

SUMMARY

In one aspect the present disclosure relates to a vehicle article carrier adapted to carry articles above an outer body surface of a vehicle. The vehicle article carrier may comprise a pair of support rails formed from a non-metallic material, with each support rail further including a bottom wall having at least one cutout potion at an intermediate point along a length thereof. At least one cross bar may have a length sufficient to span a distance between the support rails. A plurality of fasteners may be used for securing the support rails to the outer body surface such that the support rails extend along a major longitudinal length of the vehicle and generally parallel to one another. At least one bracket may be associated with each one of the pair of support rails. The bracket may be dimensioned to fit within the cutout portion in its associated support rail. Each bracket may include a base portion and a mounting portion extending generally transversely of the base portion. Each bracket may have a pair of mounting flanges for securing opposing ends of the base portion to the bottom wall of its associated support rail. Each bracket may have a mounting post for securing to structure associated with the outer body surface. The mounting portion may include structure for enabling a fastening component associated with the cross bar to be secured directly to the mounting portion of the bracket, such that an end of the cross bar is fully supported only by the bracket and the outer body surface of the vehicle. In this manner the associated support rail experiences substantially no load from the bracket and the cross bar attached to the bracket.

In another aspect the present disclosure relates to a vehicle article carrier adapted to carry articles above an outer body surface of a vehicle. The vehicle article carrier may comprise a pair of support rails formed from a non-metallic material, with each support rail further including a bottom wall having a plurality of cutout potions at intermediate points along a length thereof. At least one cross bar may be included which has a length sufficient to span a distance between the support rails. A plurality of fasteners may be used for securing the support rails to the outer body surface such that the support rails extend along a major longitudinal length of the vehicle and generally parallel to one another. A pair of brackets may be included, with each bracket being associated with one of the pair of support rails. The brackets may each be dimensioned to fit within a respective one of the cutout portions in its associated support rail. Each bracket may include a base portion and a mounting portion extending non-parallel to the base portion. Each bracket may further have a pair of mounting flanges for securing opposing ends of its base portion to the bottom wall of its associated support rail. Each bracket may further include a mounting component for securing to fastening structure associated with the outer body surface, such that the base portion is able to be secured against the outer body surface. The mounting portion may include structure that enables the cross bar to be secured directly to the mounting portion of the bracket such that an end of the cross bar is fully supported only by the bracket and the outer body surface of the vehicle. In this manner the associated support rail experiences substantially no load from the bracket and the cross bar attached to the bracket. The load from the articles supported on the cross bar is transmitted directly through the bracket to the outer body surface of the vehicle.

In still another aspect the present disclosure relates to a vehicle article carrier adapted to carry articles above an outer body surface of a vehicle. The vehicle article carrier may comprise a pair of support rails formed from a plastic material. Each support rail may include a bottom wall having a plurality of cutout potions at intermediate points along a length thereof. At least one cross bar may be included that has a length sufficient to span a distance between the support rails. A plurality of fasteners may be used for securing the support rails to the outer body surface such that the support rails extend along a major longitudinal length of the vehicle and generally parallel to one another. A pair of brackets may be included which are associated with each one of the pair of support rails. The brackets may each be dimensioned to fit within a respective one of the cutout portions in its associated support rail. Each bracket may include a base portion and a mounting portion extending generally perpendicular to the base portion. Each bracket may further have a pair of mounting flanges for securing opposing ends of the base portion to the bottom wall of its associated support rail. Each bracket may also have a threaded mounting post for securing to fastening structure associated with the outer body surface, such that the base portion is able to be secured against the outer body surface without interference from its associated support rail. The mounting portion may include at least one boss portion having a hole in registration with an opening in an inside wall portion of the associated support rail. This enables the cross bar to be secured directly to the mounting portion of the bracket such that an end of the cross bar is fully supported only by the bracket and the outer body surface of the vehicle. In this manner the associated support rail experiences essentially no load from the bracket and the cross bar attached to the bracket. The load from the articles supported on the cross bar is transmitted directly through the bracket to the outer body surface of the vehicle.

It should be understood that the following description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 7 is another implementation of the support rail which incorporates a length of track in place of one of the metallic insert brackets, to thus provide a degree of adjustability to one of the cross bars secured to the track.

DETAILED DESCRIPTION

Figure 1:
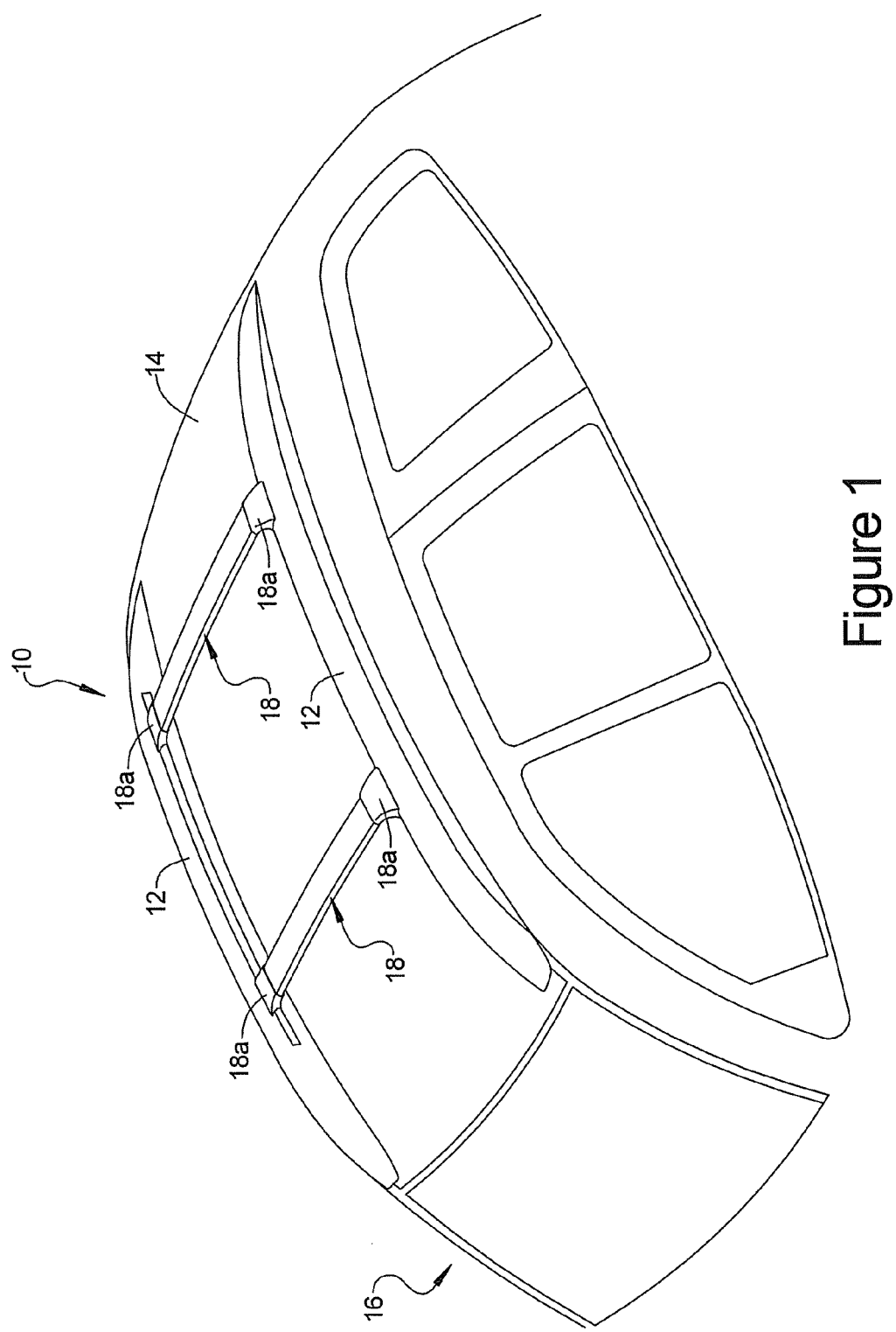
FIG. 1 is a perspective view of a motor vehicle having a vehicle article carrier in accordance with one embodiment of the present disclosure fixedly secured thereto.

The following description is merely exemplary in nature and is not intended to limit the present disclosure, application or uses. It should be understood that throughout the drawings, corresponding reference numerals indicate like or corresponding parts and features.

Referring to FIG. 1, there is shown a vehicle article carrier system 10 in accordance with one embodiment of the present disclosure. The system 10 includes a pair of support rails 12 that are fixedly secured to an outer body surface 14 of a motor vehicle 16, which in this example is an SUV. However, it will be appreciated that the vehicle 16 could be a sedan, a minivan, a truck, a van or virtually any other type of vehicle. As such, it will be appreciated that the system 10 will find utility with a wide variety of vehicles. The system 10 may be secured to the outer body surface 14 using any suitable fasteners. One well known suitable fastener is a RIVNUT® fastener. The fasteners, if same are provided by the vehicle manufacturer, are disposed in known, predetermined locations in the outer body surface 14, and often are positioned in the roof ditch of a vehicle. Alternatively the vehicle manufacturer may simply provide holes in the vehicle's roof at predetermined locations. In either event, the locations of the holes or fasteners will be dictated by the vehicle manufacturer. Typically at least two holes or fasteners, but often up to four or five, will be provided by the manufacturer for fixedly securing each support rail 12.

The system 10 further includes at least one cross bar 18, and more preferably two cross bars 18. The cross bars 18 in this example are identical in construction but they need not be identical. The cross bars 18 each have a length that spans the spacing between the support rails 12 and allow a wide variety of articles of various shapes and sizes to be supported thereon. Typically the articles are secured using various external cords or straps (not shown). End support assemblies 18a at the opposing ends of each cross bar 18 provide the means for securing the opposing ends to the support rails 12.

Figure 2:
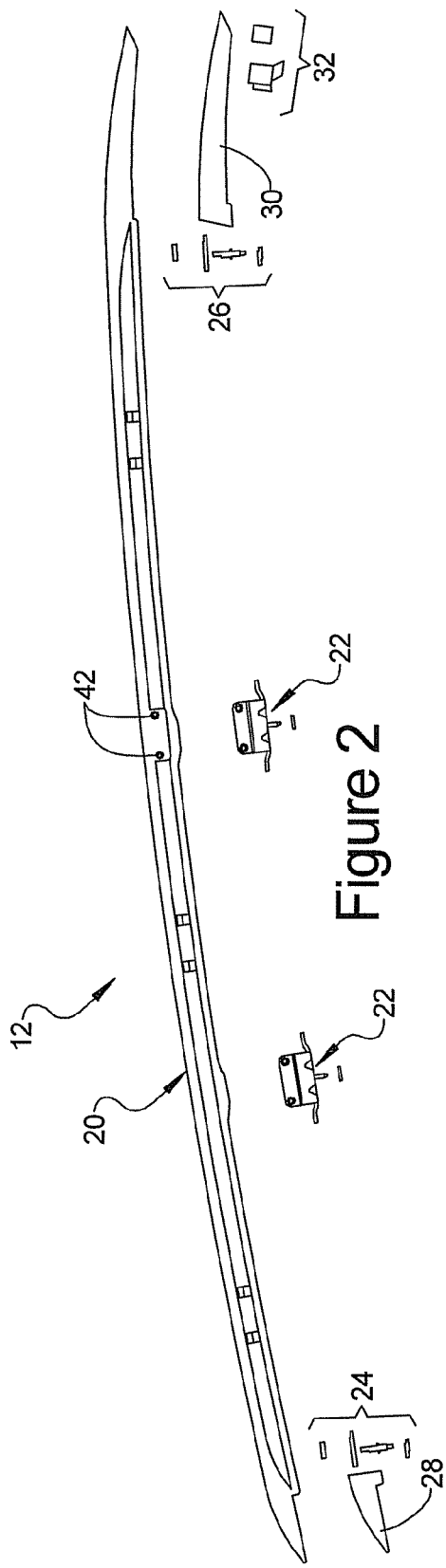
FIG. 2 is a perspective view of just one of the support rails shown in FIG. 1 with no cross bars attached to it, illustrating the various components of the support rail.

One of the support rails 12 is shown in FIGS. 2-6. Since the construction of the two support rails 12 is identical in this instance, the description of one will apply to the other. With reference specifically to FIG. 2, the support rail 12 is unique in that includes a decorative plastic component 20 with one or more metallic insert brackets 22 (hereinafter simply "bracket 22") positioned within it that form the attachment points for the cross bars 18. Thus, the overall support rail 12 forms an extremely light weight and highly cost efficient component because only a relative small portion of the rail 12 is made from a metallic material. A particular manufacturing advantage is that the plastic component 20 can be formed using conventional blow molding technology, which is a highly cost efficient way of manufacturing hollow plastic articles.

Figure 3:
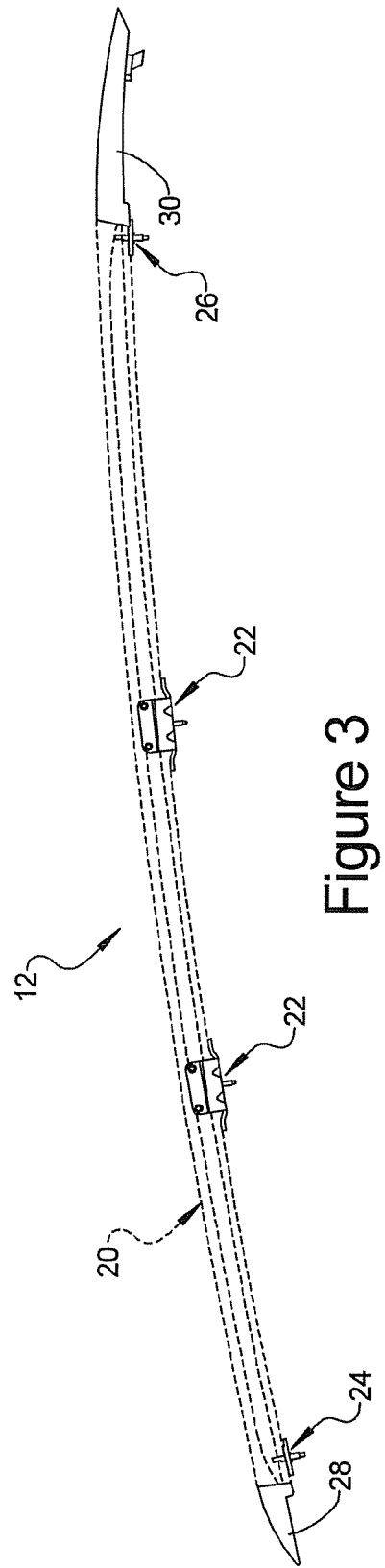
FIG. 3 is a perspective view of the support rail of FIG. 2 showing the metallic insert brackets secured to a decorative component of the support rail, where the decorative component is shown in phantom.

In FIGS. 2 and 3 it can be seen that securing assemblies 24 and 26 may be used to secure the outermost longitudinal ends of the decorative plastic component 20 to the outer body surface 14, as well as to secure decorative plastic aerodynamic front and rear end pieces 28 and 30, respectively, at the leading and trailing ends of the component 20. The end pieces 28 and 30 effectively plug the ends of the component 20. The securing assembly 32 may also help to secure the rear end piece 30 to the outer body surface 14. While only two brackets 22 are shown in FIGS. 2 and 3, it will be appreciated that a greater or lesser number of brackets 22 could readily be incorporated into the decorative plastic component 20. If more than two brackets 22 are used, then a user would be afforded a degree of adjustability in the spacing of the cross bars 18, but the overall weight of each support rail 12 would be increased just slightly.

Figure 4:
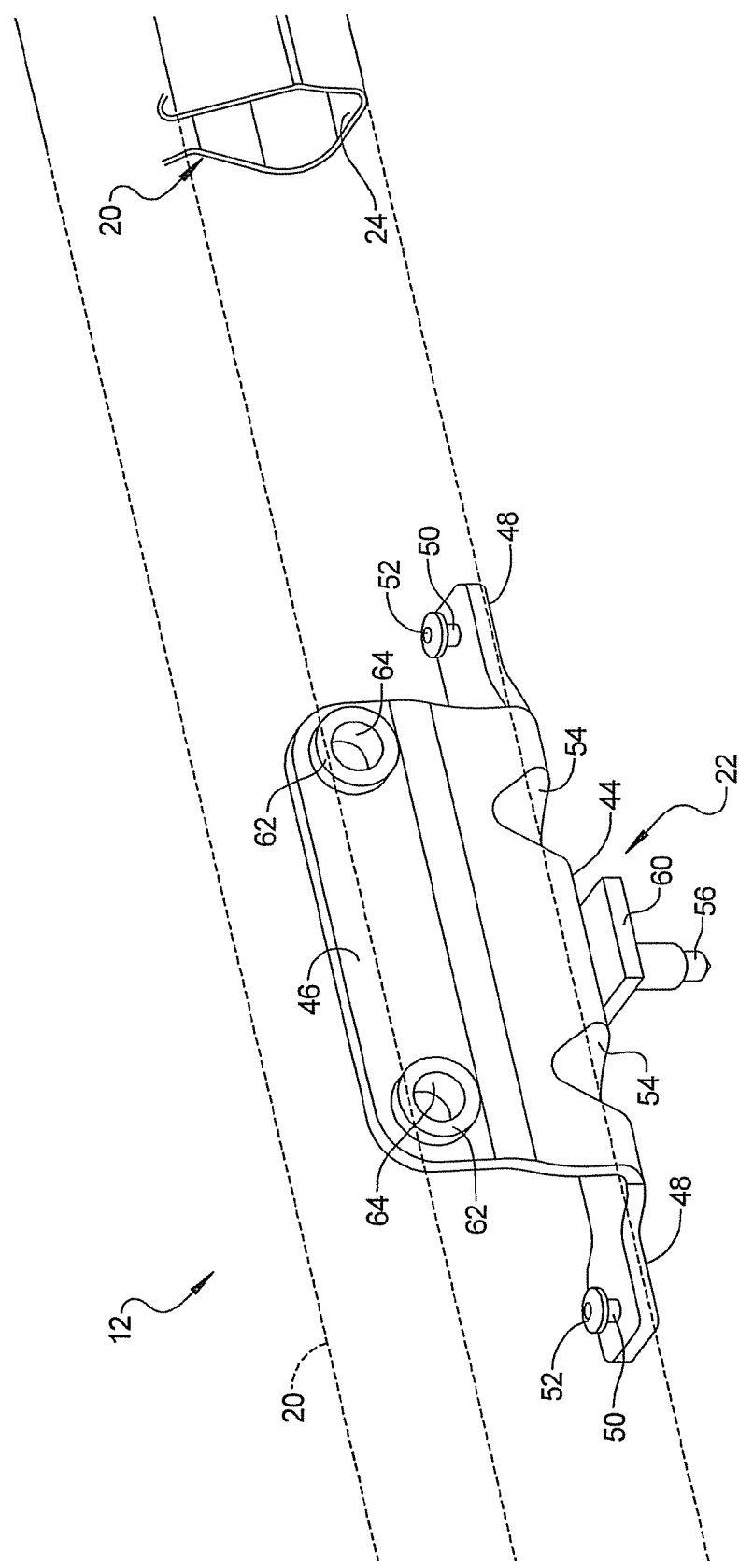
FIG. 4 is an enlarged, perspective view of a portion of the support rail of FIG. 2 looking at an inside surface wall of the support rail, with the decorative component shown in phantom and one of the metallic insert brackets positioned within a cutout of the decorative component.
Figure 5:
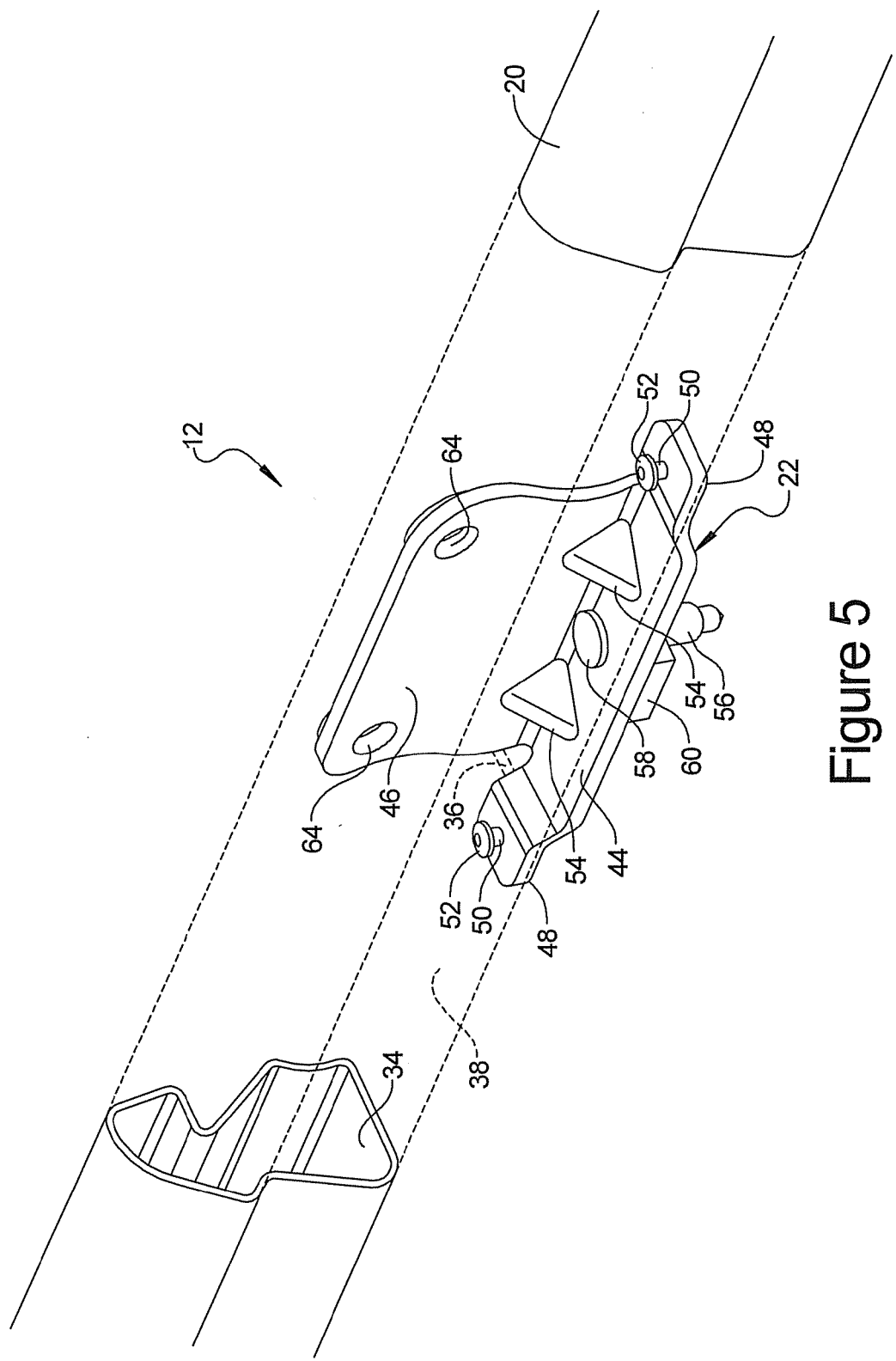
FIG. 5 is a perspective view of the support rail of FIG. 4 but taken from the opposite orientation shown in FIG. 4.
Figure 6:
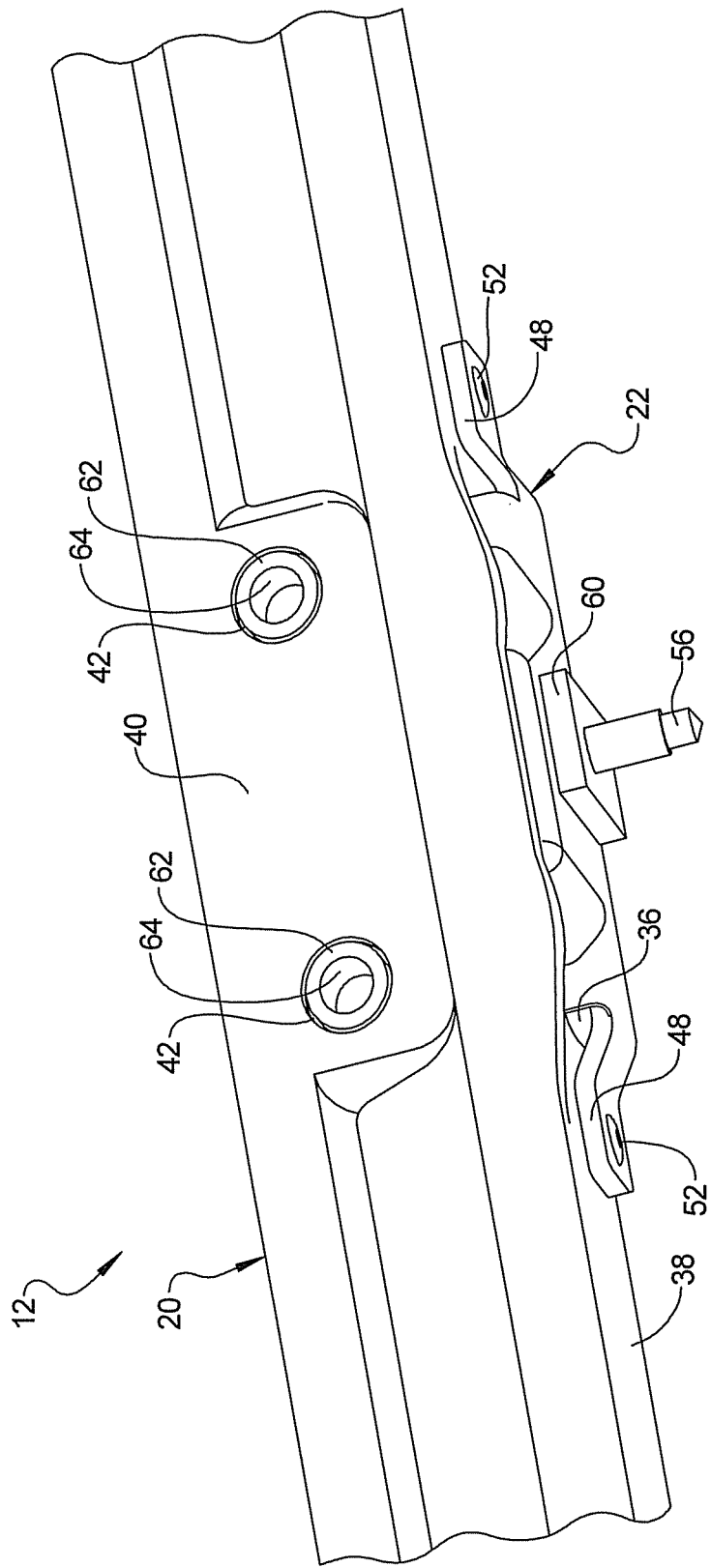
FIG. 6 is an enlarged, perspective view of the metallic insert bracket mounted within the decorative component, while looking at the inside wall portion of the decorative component.

Referring to FIGS. 4-6, an enlarged portion of the decorative plastic component 20 is shown. The decorative component 20 has a hollow interior area 34 with a cutout 36 within a lower wall portion 38 (FIGS. 5 and 6). In FIG. 6 an inside wall portion 40 of the plastic component 20 includes two circular cutouts 42 for the bracket 22. It will be appreciated that a cutout 36 and a pair of cutouts 42 will be provided for each bracket 22. So if two brackets 22 are used with one decorative component 20, then two pairs of cutouts 42 and two cutouts 36 will be provided. The cutouts 36 and 42 are further provided at those predetermined positions on the decorative component 20 where the brackets 22 are to be secured to the outer body surface 14. Put differently, the attachment points on the outer body surface 14 control the placement and spacing of the cutouts 36 and 42. The cutout 36 and the cutouts 42 may be formed in a subsequent machining operation on the decorative component 20 after the component 20 is formed in a blow molding operation.

With further reference to FIGS. 5 and 6, the bracket 22 can be seen to include a base portion 44 and a mounting portion 46 integrally formed as a single piece component. The bracket 22 may be formed from any suitably strong metallic material but typically is formed from aluminum. While the bracket 22 is shown as a single piece component, it could just as readily be formed from two or more component pieces that are brazed, welded or otherwise joined by independent fasteners. However, it is expected that an especially economical means of manufacturing the bracket 22 will be by a stamping process, followed by drilling and other machining operations. The bracket 22 includes two opposed mounting flanges 48 extending from the base portion 44 which each have holes 50 through which rivets 52 may be inserted. The rivets 52 may be used to secure the bottom wall 38 of the decorative plastic component 20 to the bracket 22. The rivets 52 extend through holes (not shown) in the bottom wall 38 and form a means for permanently attaching the bracket 22 to the decorative component 20.

With continuing reference to FIGS. 4, 5 and 6, The flanges 48 may be offset from the base portion 44 such that when the base portion 44 is positioned in a roof ditch on the outer body surface 14, the decorative component 20 will be presented generally flush with the outer body surface 14. The base portion 44 may include one or more gussets 54 for providing structural strength and rigidity to the bracket 22. A threaded mounting post 56 is secured within a hole 58 in the base portion 44 by a suitable fastener 60 (FIG. 6). The mounting post 56 may used to attach the bracket 22 to the outer body surface 14 by inserting it through the pre-formed hole in the outer body surface 14 and fixedly securing it to the outer body surface 14 with an external threaded fastener (not shown).

The mounting portion 46 may be formed with two bosses 62 that each have a threaded hole 64 (FIGS. 4 and 6). The holes 64 are configured (i.e., in size and spacing) to accept predetermined threaded fasteners associated with one of the end supports 18a at the opposing ends of one of the cross bars 18. As such, it will be appreciated that when one of the cross bars 18 is attached to the bracket 22, the cross bar will effectively be attached directly to the outer body surface 14 (e.g., the vehicle's roof) by the bracket 22. Thus, the decorative component 20 will not be supporting the weight of the cross bar 18 or otherwise providing any of the attachment force that holds the bracket 22 to the outer body surface 14. This is a principal feature of the system 10 that allows the plastic decorative component 20 to be made as a hollow, relatively low strength (as compared to aluminum), yet inexpensive component.

Referring now to FIG. 7, another embodiment 12' of the support rail 12 is shown. In this alternative implementation the support rail 12' includes a decorative plastic component 20' which may be secured to a short section of metallic track 70 having a channel 72. The track 70 may be formed from aluminum or any other metallic material which is structurally strong. The track 70 need not extend along the entire length of the support rail 12', but rather may be a selected length (e.g., 12 inches; 305 mm) that allows a degree of adjustability to the spacing of one of the cross bars 18 when the cross bar is secured to the channel 72 of the track 70. The channel 72 will obviously require a different type of mounting structure to be incorporated in the end support 18a, for example a threaded bolt and a conventional tap plate (not shown), where the tap plate is dimensioned to be able to fit within the channel 72. The tap plate may then be used with its associated threaded bolt to secure the end support 18a to the track 70. The track 70 itself may be secured directly to the outer body surface 14 at one or more predetermined locations on the outer body surface by one or more threaded members 74 that are fixedly secured to the track 70. In this embodiment, the decorative component 20' may be formed such that one or more edges are sufficiently thin in cross-sectional area so that the edges may be just slightly flexible. This would enable the one or more edges to be snapped over portions of the track 70.

From the foregoing it will be appreciated that the various embodiments of the support rails 12 and 12' form extremely lightweight components that may be manufactured in a highly cost competitive way. Blow molding is one especially cost effective means by which the decorative components 20 and 20' of the support rails 12 and 12', respectively, may be manufactured. Blow molding also enables the decorative components 20 or 20' to be formed with a wide variety of contours and aesthetically and aerodynamically appealing features and surface details that might otherwise be too difficult or costly to implement if the entire support rail were to be formed from a metallic material such as aluminum.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A vehicle article carrier adapted to carry articles above an outer body surface of a vehicle, the vehicle article carrier comprising:

a pair of support rails formed from a non-metallic material, each said support rail further including a bottom wall having at least one cutout potion at an intermediate point along a length thereof;

at least one cross bar having a length sufficient to span a distance between the support rails;

a plurality of fasteners for securing the support rails to the outer body surface such that the support rails extend along a major longitudinal length of the vehicle and generally parallel to one another;

at least one bracket associated with each one of the pair of support rails, the bracket being dimensioned to fit within the cutout portion in its associated said support rail, each said bracket including:

a base portion and a mounting portion extending generally transversely of the base portion;

a pair of mounting flanges for securing opposing ends of the base portion to the bottom wall of its associated said support rail;

a mounting component for securing to structure associated with the outer body surface; and the mounting portion including structure for enabling a fastening component associated within the cross bar to be secured directly to the mounting portion of the bracket, such that an end of the cross bar is fully supported only by the bracket and the outer body surface of the vehicle, and such that said associated support rail experiences substantially no load from the bracket and the cross bar attached to the bracket.

2. The vehicle article carrier 1, wherein the flanges are offset from the base portion, and the base portion is dimensioned to rest within a roof ditch channel in the outer body surface, with the flanges being generally co-planar with the outer body surface.

3. The vehicle article carrier of claim 1, wherein each said support rail includes an inside wall portion having at least one hole adjacent the cutout portion, and wherein the structure of the mounting portion of the bracket is in registration with the hole in the inside wall portion, with the mounting portion being disposed within an interior area of the support rail.

4. The vehicle article carrier of claim 3, wherein the structure includes a boss having a threaded hole.

5. The vehicle article carrier of claim 1, wherein the mounting portion of the bracket includes a pair of bosses each having a threaded hole, the threaded holes adapted to engage with the cross bar such that the end of the cross bar is supported from the mounting portion of the bracket.

6. The vehicle article carrier of claim 1, wherein each said support rail includes a plurality of cutout portions at intermediate points along the length thereof, and a bracket is secured at each of the cutout portions.

7. The vehicle article carrier of claim 1, wherein the mounting component comprises a threaded mounting post.

8. The vehicle article carrier of claim 1, further comprising metallic channel components adapted to rest within interior portions of each of the support rails, with each said metallic channel portion being secured directly to the outer body surface of the vehicle.

9. The vehicle article carrier of claim 1, further comprising a pair of cross rails.

10. A vehicle article carrier adapted to carry articles above an outer body surface of a vehicle, the vehicle article carrier comprising:
a pair of support rails formed from a non-metallic material, each said support rail further including a bottom wall having a plurality of cutout potions at intermediate points along a length thereof;
at least one cross bar having a length sufficient to span a distance between the support rails;
a plurality of fasteners for securing the support rails to the outer body surface such that the support rails extend along a major longitudinal length of the vehicle and generally parallel to one another;
a pair of brackets associated with each one of the pair of support rails, the brackets each being dimensioned to fit within a respective one of the cutout portions in its associated said support rail, each said bracket including:
a base portion and a mounting portion extending non-parallel to the base portion;
a pair of mounting flanges for securing opposing ends of the base portion to the bottom wall of its associated said support rail;
a mounting component for securing to fastening structure associated with the outer body surface, such that the base portion is able to be secured against the outer body surface; and
the mounting portion including structure that enables the cross bar to be secured directly to the mounting portion of the bracket, such that an end of the cross bar is fully supported only by the bracket and the outer body surface of the vehicle, and such that said associated support rail experiences substantially no load from the bracket and the cross bar attached to the bracket, with the load from the articles supported on the cross bar being transmitted directly through the bracket to the outer body surface of the vehicle.

11. The vehicle article carrier of claim 10, wherein the flanges of the bracket are offset from the base portion, and wherein the base portion is dimensioned to be positioned within a roof ditch on the outer body surface of the vehicle.

12. The vehicle article carrier of claim 10, wherein each said bracket includes at least one gusset.

13. The vehicle article carrier of claim 10, wherein the mounting component includes a threaded mounting post.

14. The vehicle article carrier of claim 10, wherein each said support rail includes an inside wall portion having at least one hole adjacent the cutout portion, and wherein the structure of the mounting portion of the bracket is in registration with the hole in the inside wall portion, with the mounting portion being disposed within an interior area of the support rail.

15. The vehicle article carrier of claim 14, wherein the structure of the mounting portion includes at least one boss adapted to lie in registration with the hole adjacent the cutout portion.

16. The vehicle article carrier of claim 15, wherein the boss includes a threaded hole.

17. The vehicle article carrier of claim 10, further comprising a pair of metallic channel elements each adapted to be positioned substantially within an interior portion of an associated one of the support rails, and adapted to be fixedly secured directly to the outer body surface.

18. A vehicle article carrier adapted to carry articles above an outer body surface of a vehicle, the apparatus comprising:
a pair of support rails formed from a plastic material, each said support rail further including a bottom wall having a plurality of cutout potions at intermediate points along a length thereof;
at least one cross bar having a length sufficient to span a distance between the support rails;
a plurality of fasteners for securing the support rails to the outer body surface such that the support rails extend along a major longitudinal length of the vehicle and generally parallel to one another;
a pair of brackets associated with each one of the pair of support rails, the brackets each being dimensioned to fit within a respective one of the cutout portions in its associated said support rail, each said bracket including:
a base portion and a mounting portion extending generally perpendicular to the base portion;
a pair of mounting flanges for securing opposing ends of the base portion to the bottom wall of its associated said support rail;
a threaded mounting post for securing to fastening structure associated with the outer body surface, such that the base portion is able to be secured against the outer body surface without interference from its associated said support rail; and
the mounting portion including at least one boss portion having a hole in registration with an opening in an inside wall portion of the associated said support rail, which enables the cross bar to be secured directly to the mounting portion of the bracket, such that an end of the cross bar is fully supported only by the bracket and the outer body surface of the vehicle, and such that said associated support rail experiences essentially no load from the bracket and the cross bar attached to the bracket, with the load from the articles supported on the cross bar being transmitted directly through the bracket to the outer body surface of the vehicle.

19. The vehicle article carrier of claim 18, further comprising a pair of cross bars adapted to be secured to the brackets.

20. The vehicle article carrier of claim 18, wherein each said bracket is formed from a single piece of material.

* * * * *